Feb. 6, 1973 C. W. CAIN, JR., ET AL Re 27,572

DIATOMACEOUS SILICA PIGMENTS AND THE LIKE

Filed Nov. 22, 1966 2 Sheets-Sheet 1

INVENTORS
CLIFFORD W. CAIN, JR.
DONALD E. BRODY
BY John A. McKinney
THEIR ATTORNEY Feb. 6, 1973 C. W. CAIN, JR., ET AL Re. 27,572

DIATOMACEOUS SILICA PIGMENTS AND THE LIKE

Filed Nov. 22, 1966 2 Sheets-Sheet 2

INVENTORS
CLIFFORD W. CAIN, JR.
DONALD E. BRODY
BY John A. McKinney
THEIR ATTORNEY United States Patent Office Re. 27,572
Reissued Feb. 6, 1973

27,572
DIATOMACEOUS SILICA PIGMENTS AND THE LIKE

Clifford William Cain, Jr., Bound Brook, and Donald Earl Brody, Verona, N.J., assignors to Johns-Manville Corporation, New York, N.Y.

Original No. 3,499,778, dated Mar. 10, 1970, Ser. No. 596,119, Nov. 22, 1966. Application for reissue May 15, 1970, Ser. No. 37,942
Int. Cl. C09c *1/28*
U.S. Cl. 106—288 B 3 Claims

Matter enclosed in heavy brackets [ ] appears in the original patent but forms no part of this reissue specification; matter printed in italics indicates the additions made by reissue.

ABSTRACT OF THE DISCLOSURE

A diatomaceous silica flatting agent capable of imparting both a high level of smoothness and a low level of 60 degree gloss and 85 degrees sheen to various paints, the flatting agent being characterized by not more than about 5 percent diatomaceous silica coarser than about 10 microns, by a least 80 percent between about 2 and about 10 microns, and not more than about 15 percent smaller than about 2 microns, the particle sizes being the equivalent Stokes diameters obtained by a sedimentation test using the conventional Klein hydrometer technique.

This invention relates to extender pigments for liquids and plastics but especially to flatting agents for paint and varnish vehicles and to a method of producing the same and also to improved paint and varnish vehicles containing the novel agents. More particularly the invention pertains to improved flatting agents consisting essentially of diatomaceous silica which is capable, when incorporated into a base paint or varnish, of providing with greater efficiency than conventional diatomaceous silica pigments giving similar Hegman fineness values, a dry film of the finish exhibiting a high degree of freedom from specular reflection, i.e. gloss and sheen, and, at the same time, a high degree of surface smoothness. The improved diatomaceous silica pigments also exhibit desirable high oil absorption characteristics and desirable wet density low properties, and in addition exhibit a marked ability to impart to base paints, into which they are incorporated, improved wearability, washability, and stain resistance characteristics, compared with previously known commercial grades of diatomaceous silica pigments. The improved diatomaceous silica pigments may also be used advantageously in other applications; for example, as an anti-blocking agent in plastic films and sheets.

Heretofore it has been known to incorporate inorganic siliceous pigments into paint vehicles as flatting agents. Some of the common inorganic siliceous pigments are diatomaceous silica, silica, silica gel (aerogel and xerogel) and some talcs. They consist of solid, insoluble particles, capable of remaining at or near the surface of coatings while wet and during film formation. They are essentially transparent because their refractive indices are close to those of the commonly used binders, but able to produce flatting because of the uneven surface and uneven light reflection so formed. It has been observed, however, that while these flatting agents may reduce specular reflection, the coating finish generally lacks the desired degree of smoothness, wearability, washability and uniformity. A flatting agent composed of very finely divided ground diatomaceous silica may give smoothness, for instance, but generally this characteristic is accompanied by a marked decrease in the flatting efficiency of the diatomaceous silica. By contrast, the flatting agents of this invention efficiently impart highly desirable diffuse reflection characteristics in dry films formed from the paint and varnish vehicles containing them, and at the same time impart advantageous smoothness properties to the coatings in which the flatting agent is incorporated.

It has been observed that, with the increased acceptance and use of high-speed disc-type dispersion apparatus for admixing pigmentary material in a base paint or varnish vehicle, conventional diatomaceous silica flatting agents are generally not sufficiently fine or sufficiently uniform in particle size to be effectively dispersed using such high speed equipment, and that efforts to comminute the diatomaceous silica, such as by pulverizing or grinding in a hammer mill, ball or pebble mill, prior to such use, have resulted in the production of a flatting agent of markedly diminished effectiveness, due to the rupture or breakdown of the diatomite structure.

It is therefore a principal object of the instant invention to provide diatomaceous silica for use as a flatting agent which efficiently produces both highly desirable diffusion of light reflection and smoothness characteristics in dry films of a paint or varnish base in which it is incorporated.

Another object of this invention is to provide a novel method for producing diatomaceous silica flatting agents containing particles within certain size ranges to permit their efficient dispersion in base paints, using high speed impeller-type dispersion apparatus and to give highly desirable diffuse reflection and smoothness properties in dry films of the paints.

A further object of the invention is the provision of improved paints and varnishes having incorporated therein a novel diatomaceous silica flatting agent made in accordance with the invention.

Still another object of the present invention is the provision of novel diatomaceous silica pigments exhibiting high oil absorption characteristics and desirable wet density properties as well as a marked ability to impart to base paints, into which they are incorporated, improved wearability, washability and stain-resistance characteristics compared with previously known commercial grades of diatomaceous silica pigments.

Other objects and advantages of the invention will become more apparent from the following detailed description and the accompanying drawings in which.

Figure 1:
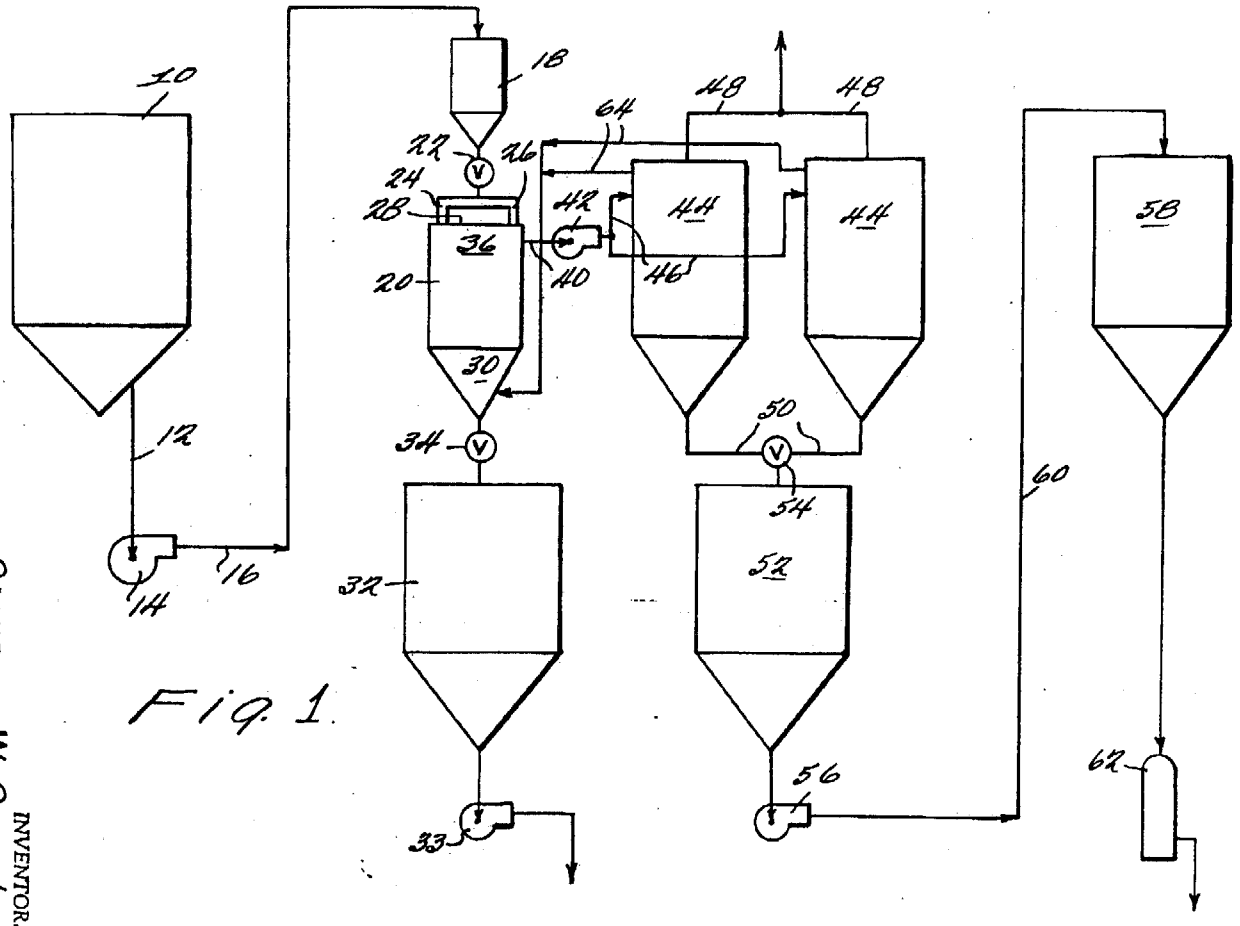
FIG. 1 is a schematic flow sheet of the novel process of this invention.

Less than optimum performance characteristics, as flatting agents, of conventional types of diatomaceous silica presently available are demonstrated in the following examples where the results obtained clearly indicate that such diatomaceous silica materials having particle size ranges of conventional values do not constitute flatting agents which are capable of giving high flatting efficiency as well as desirable smoothness characteristics. It will be seen from the data collected that in some instances, while good reduction of specular reflection properties was achieved, the desired smoothness characteristics were not attained. In other investigations, the smoothness of the resulting film or coating was improved but at a sacrifice of flatting efficiency. In these examples, the smoothness attainable by a given pigment is measured in terms of the Hegman fineness reading of a typical dispersion of the pigment investigated made in a selected base paint with a high-speed disc type of disperser, a laboratory high-speed mixer equipped with a Cowles style, toothed disc impeller. The specular reflection characteristics, i.e. the gloss and sheen properties of the coating are reported in terms of reflection from the coating surface of a beam of light directed at it at an angle of 60 degrees and 85 degrees, respectively, from the normal, i.e. perpendicular to the surface, measured with a Photovolt Reflectometer.

FLATTING AGENT—DIATOMACEOUS SILICA

| | Ex. I | Ex. II | Ex. III |
|---|---|---|---|
| Properties: | | | |
| Oil Absorption (Gardner Coleman Method), lb. oil/100 lb. of diatomaceous silica | 140-145 | 120 | 125 |
| Specific gravity | 2.30 | 2.30 | 2.30 |
| pH (Max.-Min.) | 10.0-8.5 | 10.0-8.5 | 10.0-8.5 |
| Density (lbs./ft.$^3$): | | | |
| Loose (avg.) | 8.5 | 8.5 | 8.5 |
| Wet (max.) | 24.0 | 27.0 | 30.0 |
| Brightness (avg.) TAPPI T 452m-45 | 89 | 90 | 92 |
| Refractive index | 1.45-1.49 | 1.45-1.49 | 1.45-1.49 |
| Composition: | | | |
| $H_2O$ | 0.1 | 0.1 | 0.1 |
| Ignition Loss | 0.2 | 0.2 | 0.2 |
| $SiO_2$ | 91.9 | 91.9 | 91.9 |
| $Al_2O_3$ | 3.3 | 3.3 | 3.3 |
| $Fe_2O_3$ | 1.2 | 1.2 | 1.2 |
| $P_2O_5$ | 0.2 | 0.2 | 0.2 |
| $TiO_2$ | 0.2 | 0.2 | 0.2 |
| CaO | 0.5 | 0.5 | 0.5 |
| MgO | 0.5 | 0.5 | 0.5 |
| $Na_2O+K_2O$ | 2.0 | 2.0 | 2.0 |
| Water Solubles, Total | 0.15 | 0.15 | 0.15 |
| Particle Size Analysis: | | | |
| Wt. percent falling in micron size within each of the following ranges: | | | |
| 20-10μ | 12.5 | ---------- | 0.4 |
| 10-8μ | 13.5 | ---------- | 1.4 |
| 8-6μ | 23.0 | 5.0 | 6.2 |
| 6-4μ | 27.0 | 19.0 | 23.0 |
| 4-2μ | 17.0 | 47.0 | 46.5 |
| 2-1μ | ---------- | ---------- | 16.0 |
| Wt. percent falling in micron size range finer than— | | | |
| 2μ | 7.0 | 26.0 | ---------- |
| 1μ | ---------- | 3.0 | 6.5 |
| Screen Residue: Percent Retention on 325 mesh avg., ASTM D 185-45 | 1.2 | Trace | 0.1 |
| Smoothness: Hegman Fineness Reading | 2-3 | 5.56 | 4-4.5 |
| Flatting (in the paint composition set forth in Ex. VIII and IX, and dispersed by the procedure described below in Ex. VIII and IX): | | | |
| 60°—Gloss | 7-13 | 19-25 | 18-24 |
| 85°—Sheen | 7-17 | 50-60 | 40-50 |

Each of the above described flatting agents was intimately mixed with an alkyd high gloss enamel containing 29% by weight of binder solids in a conventional disc dispersion apparatus (a laboratory model high-speed mixer equipped with a Cowles-type toothed disc impeller) for 5 minutes to produce a paint vehicle in which the flatting agent was present in amounts of 8.5% by weight of said paint vehicle.

It can be seen from the data above that the flatting characteristics attained in Example I are favorable although the smoothness properties are less than desirable. The data of Example II show a quite favorable increase in the smoothness properties as a result of employing a flatting agent having a finer overall particle size. It will be noted, however, that a marked decrease in the flatting characteristics resulted. In Example II, favorable smoothness characteristics have been achieved and while intermediate those attained in Examples I and II, are nevertheless quite acceptable for most consumer trade paints and enamels. However, the flatting properties are less than optimum and compare substantially with those achieved in Example II. It will be further noted that the gloss values of the coating formed in Example III are substantially the same as those of Example II while the sheen values were only slightly lower.

From the above it can readily be appreciated that there exists a need for flattening agents which will provide the smoothness characteristics attainable, for instance, by the diatomaceous silica employed in Examples II or III, preferably Example III, and at the same time yield gloss and sheen flatting characteristics attained by the use of the diatomaceous silica of Example I.

This need has been fulfilled by the diatomaceous silica flatting agents of the instant invention which contain at least about 85 weight percent silica, remainder consisting essentially of a mixture of oxides of alumina, iron, phosphorous, calcium, magnesium, sodium and potassium, together with minor amounts of water and volatile matter. One novel diatomaceous silica of this invention has the following particle size analysis:

| | Percent, about— |
|---|---|
| Wt. percent falling in micron size within each of the following ranges: | |
| 20-10μ | 1.0 |
| 10-8μ | 3.0 |
| 8-6μ | 11.0 |
| 6-4μ | 40.0 |
| 4-2μ | 31.0 |
| 2-1μ | 9.0 |
| Wt. percent falling in micron size range finer than: | |
| 1μ | 5.0 |

Diatomaceous silica flatting agents of this invention contain at least about 80 percent by weight of particles having an equivalent Stokes diameter within the range of about 2-10 microns. The novel flatting agents contain not more than about 5 percent by weight of particles having an equivalent Stokes diameter greater than about 10 microns, and not more than about 15 percent by weight of particles having an equivalent Stokes diameter finer than about 2 microns.

EXAMPLES IV AND V

Diatomaceous silica, according to the principles of this invention and having the following properties was admixed with an alkyd high gloss enamel, essentially the same as that employed in Examples I-III, in a conventional high speed disc type dispersion apparatus, a miniature version of the Cowles type commonly used in the paint industry, for 5 minutes to produce a novel paint vehicle in which the diatomaceous silica flatting agent was present in amounts of 8.5 percent by weight of the paint vehicle. The flatting and specular reflection data obtained are also given below.

NOVEL FLATTING AGENT—DIATOMACEOUS SILICA

| | Ex. IV | Ex. V |
|---|---|---|
| Properties: | | |
| Oil Absorption, Gardner Coleman (Absorption percent, lb. oil/100 lb. of diatomaceous silica) | 160 | 160 |
| Specific Gravity | 2.3 | 2.3 |
| pH (Max.-Min.) | 10.0-8.5 | 10.0-8.5 |
| Density (lbs./ft.$^3$): | | |
| Loose (avg.) | 8.5 | 8.5 |
| Wet (max.) | 22 | 22 |
| Brightness (avg.) TAPPI T 452m-45 | 90 | 90 |
| Refractive Index | 1.45-1.49 | 1.45-1.49 |
| Composition: | | |
| $H_2O$ | 0.1 | 0.1 |
| Ignition Loss | 0.2 | 0.2 |
| $SiO_2$ | 91.9 | 91.9 |
| $Al_2O_3$ | 3.3 | 3.3 |
| $Fe_2O_3$ | 1.2 | 1.2 |
| $P_2O_5$ | 0.2 | 0.2 |
| $TiO_2$ | 0.2 | 0.2 |
| CaO | 0.5 | 0.5 |
| MgO | 0.5 | 0.5 |
| $Na_2O+K_2O$ | 2.0 | 2.0 |
| Water Solubles, Total | 0.15 | 0.15 |
| Particle Size Analysis: | | |
| Wt. percent falling in micron size range as follows: | | |
| 20-10μ | 1.0 | 0.5 |
| 10-8μ | 3.0 | 2.5 |
| 8-6μ | 11.0 | 10.0 |
| 6-4μ | 40.0 | 40.0 |
| 4-2μ | 31.0 | 35.0 |
| 2-1μ | 9.0 | 7.5 |
| Wt. percent falling in micron size range finer than— | | |
| 2μ | ---------- | ---------- |
| 1μ | 5.0 | 4.5 |
| Screen Residue: Percent retention on 325 mesh avg., ASTM D 185-45 | Trace | Trace |
| Smoothness: Hegman Fineness reading | 4-4.5 | 4-4.5 |
| Flatting (in the paint composition set forth in Examples VIII and IX and dispersed by the procedure described in Examples VIII and IX): | | |
| 60° Gloss | 10-14 | 10-14 |
| 85° Sheen | 10-20 | 10-20 |

From the above it can be seen that the novel diatomaceous silica flatting agents of this invention provide not only improved flatting characteristics but advantageous smoothness properties as well. It is especially to be noted that it has been discovered that in order to obtain the advantages of this invention it is not only important to control the particle size distribution of the diatomaceous silica to limit the percent by weight of particles coarser in size than about 10 microns but also, and unexpectedly, that it is important to limit the percent by weight of particles finer in size than about 2 microns. It has been specifically determined that particles of diatomaceous silica below about 2 microns in size do not contribute appreciably to flatting efficiency. Thus, the flatting agents of this invention comprise finely divided diatomaceous silica containing a relatively narrow distribution of particle sizes. They can be more particularly defined as finely divided diatomaceous silica pigments containing not more than about 5 percent by weight of particles coarser in size than about 10 microns and not more than about 15 percent by weight of particles finer in size than about 2 microns, with at least about 80 percent by weight of particles falling within the range of about 2–10 microns. The particle size as referred to in this application is the equivalent. Stokes diameter obtained by sedimentation test method known as the conventional Klein Hydrometer technique. The novel diatomaceous silica flatting agents of this invention are further particularly characterized as being capable of imparting to paint bases, into which they are incorporated by dispersion with a high-speed disc type of mixer, a Hegman fineness value of at least 4 on the North Scale, and having at least about 15 percent greater efficiency in decreasing the specular reflectance and increasing the diffuse reflectance of dry films of paints, varnishes, lacquers, or enamels in which they are incorporated, compared with conventional diatomaceous silica pigments giving similar Hegman fineness values.

In addition to providing flatting and smoothness characteristics the novel diatomaceous silica extender pigments of this invention surprisingly exhibited improved stain removal or washability properties over conventional diatomaceous silica materials as can be seen from the following examples.

EXAMPLES VI AND VII

The following water-emulsion paints were compounded using the diatomaceous silica material of Examples III and IV, in Examples VI and VII respectively.

| | Ex. VI | Ex. VII |
|---|---|---|
| Paint Composition (lb./approx. 100 gal. of paint): | | |
| Diatomaceous silica | [1] 50 | [2] 50 |
| Tamol 731 (dispersant) | 10.4 | 10.4 |
| Igepal CO-630 (wetting agent) | 4.0 | 4.0 |
| Ethylene glycol | 25.0 | 25.0 |
| Carbitol acetate (coalescent) | 8.0 | 8.0 |
| Troy 333 (defoamer) | 2.0 | 2.0 |
| PMA-30 (preservative) | 0.5 | 0.5 |
| Titanox RA-50 (rutile) | 200 | 200 |
| ASP-170 (blue-white NC clay) | 150 | 150 |
| Water | 198 | 198 |

[1] Same as Ex. III.
[2] Same as Ex. IV.

The ingredients listed above were dispersed in an Osterizer blender for 10 minutes at high speed; then the following were added and mixed in at low speed:

| | | |
|---|---|---|
| Natrosol 250 HR, 2% solution (thickener) | 250 | 250 |
| Resyn 2243 (PVAc emulsion) | 275 | 275 |

The resulting paints were applied with a 3 mil film applicator on Leneta plastic scrub test panels, and then air-dried for 48 hours. Thereafter, the stain removal characteristics were tested in accordance with the procedure specified in Federal Paint Specification TT-P-29d except that Leneta plastic scrub test panels were employed in place of primed glass panels. Crayon was employed as the soiling medium and the following data were obtained.

| | Ex. VI | Ex. VII |
|---|---|---|
| Wash cycles required for complete soil removal | 1,200 | 630 |

In addition to producing good flatting and smoothness characteristics in films made from aqueous emulsion type paints in which they are incorporated, the novel flatting agents of this invention are equally effective in organic solvent thinned paints. The data in Examples VIII and IX below was obtained using the diatomaceous silica material employed in Examples III and IV, respectively.

| | Ex. VIII | Ex. IX |
|---|---|---|
| Paint Composition (lb./100 gal. of paint): | | |
| Xylol | 85.0 | 85.0 |
| Solvesso #1 | 41.7 | 41.7 |
| Soya lecithin, oil soluble | 1.0 | 1.0 |
| Styresol 4250-50 | 596 | 596 |
| Rutile titanium dioxide nonchalking | 298.0 | 298.0 |
| Antiskinning agent | 2.0 | 2.0 |
| Cobalt Naphthenate, 6% | 0.8 | 0.8 |

To 100.0 grams of the above formulation there was added 8.50 grams of diatomaceous silica, essentially the same as that of Examples III and IV, in Examples VIII and IX, respectively. The diatomaceous silica was dispersed in the paint by mixing for 10 minutes with a high speed disc type disperser, a miniature version of the Cowles type commonly used in the paint industry. The following results were obtained.

| | Ex. VIII | Ex. IX |
|---|---|---|
| Smoothness: Hegman Fineness reading | 1.5–3.75 | 4.5–5.5 |
| Flatting (Films cast with a 3 mil Bird application, and air-dried overnight): | | |
| 60° Gloss | 10.5–16 | 11.0–19.5 |
| 85° Sheen | 10–24 | 11–25 |

In addition, the novel diatomaceous silica flatting agent of this invention produced desirable uniformity characteristics when used in paint vehicles as described above and applied over surfaces of varying texture such as hard wood, plasterboard and metal. The resulting finishes on these surfaces surprisingly exhibited essentially the same flatting and smoothness properties. It has also been found that the novel flatting agents of this invention can provide substantial economies while giving better or at least equally favorable results when used in conventional semi-gloss paints to replace conventionally employed micronized talc extenders. Approximately one-third to one-half less of the novel flatting agents of this invention than micronized talc, by weight, provides these advantageous results.

It will be noted that the diameter values reported herein are theoretical Stokes' diameter figures determined by conventional sedimentation procedures such as the Klein Hydrometer Test Method.

Figure 2:
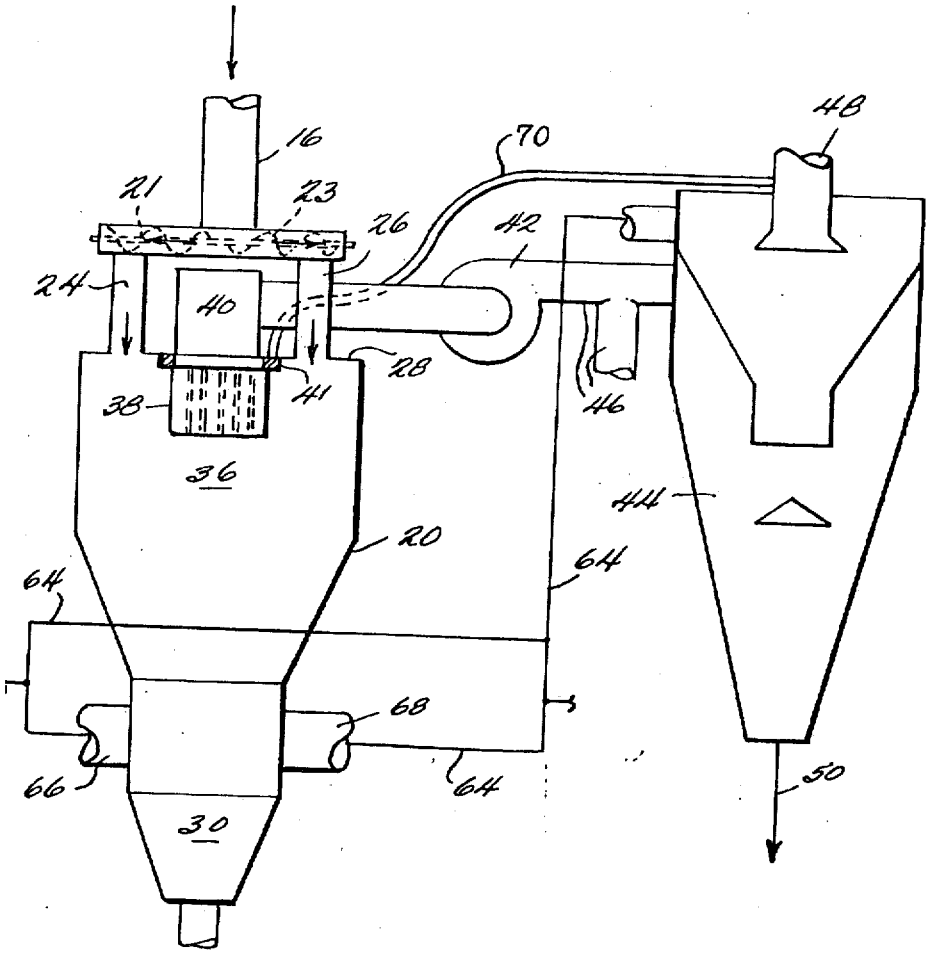
FIG. 2 illustrates the separation means utilized in the preferred process of producing diatomaceous silica of this invention.

The manufacture of the diatomaceous silica flatting agent of this invention can most easily be carried out in accordance with the scheme and apparatus illustrated in FIGURES 1 and 2 wherein 10 indicates a feed hopper adapted to contain the diatomaceous silica feed charge to be fed to the air classification zone. From hopper 10, the diatomaceous silica flows through conduit 12 to pump 14 which forces the feed charge through conduit 16, feed surge bin 18 and air classifier 20 which is shown in greater detail in FIGURE 2.

Intermediate the outlet of the feed surge bin 18 and the inlet of air classifier 20 is a seal valve 22 operated by a variable speed motor (not shown). Preferably the seal valve motor is operated at 50% of its calibrated speed, for instance at about 67 r.p.m. The inlet to the air classifier comprises a pair of feed ports 24 and 26 located generally on the center line of the lid 28 of the air classifier 20. A single screw with opposed spiral portions 21 and 23 feeds both ports from the feed surge bin 18 via seal valve 22. The classifier 20 is generally cylindrically shaped and terminates in a conical outlet portion 30 for discharge of the coarse fraction to a reservoir 32 through valve means 34.

Housed within the cylindrical portion 36 of the air classifier 20 is rotor means 38 suitably mounted for rotation and driven by a motor (not shown). In communication with the interior space of the rotor 38 is fines outlet conduit 40 provided with seal means 41. Conduit 40 is in fluid communication with the intake end of blower means 42. The discharge end of blower means 42 communicates with at least one fines collecting vessel 44 via conduit 46. Preferably a pair of fines collecting vessels connected in parallel, are employed. The fines are separated from the air in the collecting vessels, the air being expelled through vent means 48 while the fines product is discharged through outlet 50 to fines storage vessel 52 via valve means 54. It is preferred that the collecting vessel and air classifier be provided with a pressure equalizing conduit 70. From the storage vessel 52 the fines can flow to pump 56 which forces the novel diatomaceous silica flatting agent of this invention to a packer bin 58 via conduit 60. The fines collected in the packer bin 58 can then be directed to a packer unit 62 where it is appropriately packed in suitable containers.

Leading from the cylindrical portion of the fines collecting vessels 44 is return air line 64 which conveniently is in communication with the classifier 20 adjacent the conical base portion 30 thereof through a pair of diametrically opposed ports 66 and 68.

In a typical operation, a diatomaceous feed contained in bin 10 is charged to the classifier 20 at a rate of about 2560–2700 lbs./hr. The rotor 38 was operated at a speed of 1200–1400 r.p.m. while the blower 42 was operated at a speed of 2500–3150 r.p.m. The feed charge was diatomaceous silica which analyzed as follows (Johns-Manville "Hyflo" "Super-Cel"):

Composition:

| | |
|---|---|
| $H_2O$ | 0.1 |
| Ignition loss | 0.2 |
| $SiO_2$ | 91.9 |
| $Al_2O_3$ | 3.3 |
| $Fe_2O_3$ | 1.2 |
| $P_2O_5$ | 0.2 |
| $TiO_2$ | 0.2 |
| CaO | 0.5 |
| MgO | 0.5 |
| $Na_2O+K_2O$ | 2.0 |
| Water sols., Total | 0.15 |

Particle size analysis

| | |
|---|---|
| Wt. percent falling *in* micron size range coarser than: | |
| 40μ | 6.0 |
| 40–20μ | 15.5 |
| 20–10μ | 33.5 |
| 10–6μ | 22.0 |
| 6–2μ | 21.5 |
| Wt. percent falling *in* micron size range finer than: | |
| 2μ | 1.5 |

The novel diatomaceous silica flatting agent recovered from the collector 44 as fines had the particle size analysis as reported in Examples IV and V above and provided the flatting and smoothness characteristics also as reported above. Approximately 22–24 percent of the feed charge was recovered as the novel diatomaceous silica flatting agent of this invention.

The air classification apparatus described above for convenient reference, for readily carrying out the manufacture of the novel diatomaceous silica products of this invention is commercially available apparatus identified as The Wide Range Air Sifter Classifier, Models 15A and 24A, products of Air Sifters Incorporated, Greenwich, Connecticut, and the manner of operation and use of this apparatus is well understood to those skilled in that art. Other similar commercially available apparatus may be used alternatively. In the specific examples given in this aplication, the said model 24A referred to above was used.

The diatomaceous silica feed charge for this type of apparatus may be flux-calcined, natural or straight-calcined and need not have the exact composition, properties, and particle size analysis given above for the exemplary feed charge, but the "Hyflo" "Super-Cel" product mentioned works efficiently to give excellent results.

Wet densities given throughout this specification are determined by slurrying a 1 gram sample of the material in water and centrifuging the slurry in a calibrated tube at 1800 r.p.m. for 30 minutes with an International Centrifuge, Size 1, Type SB. Settled volume of the solids gives a measure of wetted density.

The novel diatomaceous silica products of this invention possess attributes which render them also particularly applicable and advantageous in areas other than the paint field, for example as pigments and fillers for general applications, as an anti-blocking agent in plastic films and sheets such as polyethylene to reduce sticking or adhesion between sheets or layers, among other uses in allied areas.

It is to be understood that variations and modifications of the present invention may be made without departing from the spirit of the invention, and that the scope of the invention is not to be interpreted as limited to the specific embodiments disclosed herein, but only in accordance with the appended claims, when read in the light of the foregoing disclosure.

What we claim is:

[1. A product consisting essentially of at least about 85 percent of finely divided diatomaceous silica containing not more than about 5 percent by weight of particles coarser in size than about 10 microns and not more than about 15 percent by weight of particles finer in size than about 2 microns, said particle sizes being the equivalent Stokes diameters obtained by a sedimentation test method using the conventional Klein Hydrometer technique, the remainder being selected from the group consisting of oxides of alumina, iron, phosphorous, calcium, magnesium, sodium, and potassium.]

[2. A product as defined in claim 1, wherein, of the diatomaecous silica particles, about 0.5–1.0 percent by weight fall within a micron size range of about 10–20 mirons, about 2.5–3.0 percent by weight fall within a micron size range of about 8–10 microns, about 10–11 percent by weight fall within a micron size range of about 6–8 microns, about 40 percent by weight fall within a micron size range of about 4–6 microns, about 31–35 percent by weight fall within a micron size range of about 2–4 microns, about 7.5–9.0 percent by weight fall within a micron size range of about 1–2 microns, and about 4.5–5.0 percent by weight fall within a micron size range of finer than about 1 micron.]

[3. A product as defined in claim 1 and characterized by a property, as a flatting agent in a coating vehicle, of at least about 15 percent greater efficiency in decreasing gloss, as determined by 60-Degree Specular Gloss measurement according to U.S. Federal Test Method Standard No. 6101, and in decreasing sheen, as determined by 85-Degree Specular Gloss measurement according to U.S. Federal Test Method Standard No. 6103, as compared with conventional diatomaceous silica pigments giving similar Hegman fineness values, in dry films of coating vehicles selected from the group consisting of natural oil based paints, synthetic oil based paints, alkyd based paints, water based paints, varnishes, lacquers, and enamels.]

4. A flat paint comprising a paint base having incorporated therein a flattening agent of [at least about 85 percent, by weight, of] finely divided diatomaceous silica containing not more than about 5 percent by weight of particles having a size greater than about 10 microns (equivalent Stokes diameter) and not more than about 15 percent by weight of particles having a size finer than about 2 microns, said flat paint characterized by a Hegman Fineness reading of at least 4 on the North Scale *and said diatomaceous silica containing at least about 85 weight percent silica.*

5. The flat paint of claim 4 wherein the paint base is an aqueous latex emulsion paint.

6. The flat paint of claim 4 wherein the paint base is an organic solvent-thinned paint selected from the group consisting of varnish and lacquer.

[7. A method for imparting simultaneously a high level of both smoothness and flatting properties to a paint base selected from the group consisting of a water thinned paint and an organic solvent thinned paint, comprising admixing with said paint base a flatting agent consisting essentially of at least about 85 percent of finely divided diatomaceous silica containing more than about 5 percent by weight of particles coarser in size than about 10 microns and not more than about 15 percent by weight of particles finer in size than about 2 microns, said particle sizes being the equivalent Stokes diameters obtained by a sedimentation test method using the conventional Klein Hydrometer technique, the remainder being selected from the group consisting of oxides of alumina, iron, phosphorous, calcium, magnesium, sodium, and potassium.]

[8. A method according to claim 7, wherein, of the diatomaceous siilca particles, about 0.5 to about 1.0 percent by weight fall within a micron size range of about 10 to about 20 microns, about 2.5 to about 3.0 percent by weight fall within a micron size range of about 8 to about 10 microns, about 10 to about 11 percent by weight fall within a micron size range of about 6 to about 8 microns, about 40 percent by weight fall within a micron size range of about 4 to about 6 microns, about 31 to about 35 percent by weight fall within a micron size range of about 2 to about 4 microns, about 7.5 to aout 9.0 percent by weight fall within a micron size range of about 1 to about 2 microns, and about 4.5 to about 5.0 percent by weight fall within a micron size range of finer than about 1 micron.]

[9. A method according to claim 7, in which said flatting agent is characterized by about at least about 15 percent greater efficiency in decreasing gloss, as determined by 60-Degree Specular Gloss measurement according to U.S. Federal Test Method Standard No. 6101, and in decreasing sheen, as determined by 85-Degree Specular Gloss measurement according to U.S. Federal Test Method Standard No. 6103, as compared with conventional diatomaceous silica pigments giving similar Hegman fineness values, in dry films of coating vehicles selected from the group consisting of natural oil based paints, synthetic oil based paints, alkyd based paints, water based paints, varnishes, lacquers, and enamels.]

References Cited

The following references, cited by the Examiner, are of record in the patented file of this patent or the original patent.

UNITED STATES PATENTS

| | | | |
|---|---|---|---|
| 1,756,906 | 4/1930 | Miketta | 106—288 B |
| 1,989,709 | 2/1935 | O'Neil | 106—288 B |
| 2,093,106 | 9/1937 | Ayers | 106—288 B |
| 2,164,500 | 7/1939 | Cummins et al. | 106—288 B |

JAMES E. POER, Primary Examiner